(12) United States Patent
Takeda et al.

(10) Patent No.: US 8,840,082 B2
(45) Date of Patent: Sep. 23, 2014

(54) FLUID CONTROL VALVE

(75) Inventors: Hideyuki Takeda, Kasugai (JP); Shinji Ikenoya, Tajimi (JP); Hiroyuki Murase, Konan (JP)

(73) Assignee: CKD Corporation, Komaki-Shi (JP)

( * ) Notice: Subject to any disclaimer, the term of this patent is extended or adjusted under 35 U.S.C. 154(b) by 0 days.

(21) Appl. No.: 13/811,533

(22) PCT Filed: Sep. 30, 2011

(86) PCT No.: PCT/JP2011/072503
§ 371 (c)(1),
(2), (4) Date: Jan. 22, 2013

(87) PCT Pub. No.: WO2012/081293
PCT Pub. Date: Jun. 21, 2012

(65) Prior Publication Data
US 2013/0119290 A1    May 16, 2013

(30) Foreign Application Priority Data
Dec. 17, 2010 (JP) .................................. 2010-282149

(51) Int. Cl.
| F16K 31/00 | (2006.01) |
| F16K 7/14 | (2006.01) |
| F16K 7/17 | (2006.01) |
| F16K 31/122 | (2006.01) |
| F16K 27/02 | (2006.01) |

(52) U.S. Cl.
CPC ... *F16K 7/17* (2013.01); *F16K 7/14* (2013.01); *F16K 31/122* (2013.01); *F16K 27/0236* (2013.01)
USPC ............................ 251/63.5; 251/331; 251/359

(58) Field of Classification Search
USPC ................ 251/63.5, 63.6, 333, 118, 331, 359
See application file for complete search history.

(56) References Cited

U.S. PATENT DOCUMENTS 1,385,058 A * 7/1921 Warter .............................. 251/82
3,134,570 A * 5/1964 Jarrett ............................ 251/331
(Continued)

FOREIGN PATENT DOCUMENTS

| CN | 101349355 A | 1/2009 |
| JP | U-63-74565 | 5/1988 |

(Continued)

OTHER PUBLICATIONS

Dec. 13, 2011 International Search Report issued in Application No. PCT/JP2011/072503 (with translation).

(Continued)

*Primary Examiner* — John Bastianelli
*Assistant Examiner* — Andrew J Rost
(74) *Attorney, Agent, or Firm* — Oliff PLC

(57) ABSTRACT

A fluid control valve is configured in a manner that a first passage has at one end portion thereof a first port communication passage communicating with a first port, and at the other end portion thereof a first valve hole communication passage communicating with a valve hole, and the first port communication passage and the first valve hole communication passage communicate with each other. The resin valve body is provided with a valve seat support part which supports the valve seat and which is provided between the valve chamber, and the first port communication passage and the first valve hole communication passage. The valve seat support part has a valve seat reinforcement part, and the valve seat reinforcement part is formed so as to partially close the inside of the first passage.

3 Claims, 8 Drawing Sheets

(56) References Cited

U.S. PATENT DOCUMENTS

| | | | | |
|---|---|---|---|---|
| 5,779,224 | A * | 7/1998 | Fukano et al. | 251/331 |
| 6,585,226 | B2 * | 7/2003 | Fukano et al. | 251/28 |
| 6,612,538 | B2 * | 9/2003 | Fukano et al. | 251/63.5 |
| 2001/0025654 | A1 | 10/2001 | Iritani et al. | |
| 2002/0053651 | A1 | 5/2002 | Fukano et al. | |
| 2007/0075284 | A1 * | 4/2007 | Masamura et al. | 251/63.5 |
| 2009/0020722 | A1 | 1/2009 | Masamura | |

FOREIGN PATENT DOCUMENTS

| JP | A-2001-280518 | 10/2001 |
|---|---|---|
| JP | A-2005-344915 | 12/2005 |
| JP | A-2006-153132 | 6/2006 |
| JP | S-1309112 | 9/2007 |
| JP | A-2007-321958 | 12/2007 |
| JP | A-2008-008415 | 1/2008 |
| JP | A-2008-088999 | 4/2008 |
| JP | A-2008-208977 | 9/2008 |
| JP | A-2009-002442 | 1/2009 |
| JP | A-2009-024812 | 2/2009 |

OTHER PUBLICATIONS

Reasons for Submission included with third party submission to Japanese Patent Office (Japanese Patent Application No. 2010-282149, with partial English-language translation).

* cited by examiner

FLUID CONTROL VALVE

This application is a national phase application of International Application No. PCT/JP2011/072503, filed on Sep. 30, 2011, and claims the priority of Japanese Application No. 2010-282149, filed Dec. 17, 2010, the contents of both of which are incorporated herein by reference.

TECHNICAL FIELD

The present invention relates to a fluid control valve including: a resin valve body formed with a first passage and a second passage; a resin valve upper body connected to an upper surface of the resin valve body; and a resin diaphragm valve element held between the resin valve body and the resin valve upper body, the first passage having one end portion formed with a first port communication passage communicating with a first port and the other end portion formed with a first valve hole communication passage communicating with a valve hole, the first port communication passage and the first valve hole communication passage being formed orthogonal to each other, and the resin valve body being formed with a valve seat support part formed between a valve chamber and the first port communication passage and the first valve hole communication passage to support a valve seat.

BACKGROUND ART

Heretofore, as a technique in this field, there is a fluid control valve 100 disclosed in Patent Document 1 indicated below.

As shown in FIG. 10, the fluid control valve 100 is configured in a manner that a resin valve upper body 102 is connected to an upper surface of a resin valve body 101 and a diaphragm valve element 103 is held between the resin valve body 101 and the resin valve upper body 102. The fluid control valve 100 is arranged in a manner to slide a piston 105 in a downward direction when air is supplied into the upper body 102 through an operation port 104, so that the diaphragm valve element 103 is brought into contact with a valve seat 106. When the air is not supplied to the operation port 104, the piston 105 is urged by a restoring spring 107 to slide in an upward direction, thereby separating the diaphragm valve element 103 from the valve seat 106. While the diaphragm valve element 103 is separated from the valve seat 106, fluid flowing in a first passage 108 is allowed to flow through a valve chamber 109 and then into a second passage 110.

Fluid control valves disclosed in other patent documents have the similar configurations and operational effects to the above.

RELATED ART DOCUMENTS

Patent Documents

Patent Document 1: JP2006-153132A
Patent Document 2: JP2008-008415A
Patent Document 3: JP2008-208977A
Patent Document 4: JP2009-002442A
Patent Document 5: JP2009-024812A

SUMMARY OF INVENTION

Problems to be Solved by the Invention

However, the above mentioned related art has the following problem.

The first passage 108 shown in FIG. 10 consists of a first port communication passage 108B communicating with a first port and a first valve hole communication passage 108A communicating with the valve chamber 109. The first port communication passage 108B and the first valve hole communication passage 108A are formed to be orthogonal to each other just under a valve hole 111. Between the first port communication passage 108B and the valve chamber 109, a valve seat support part 120 is formed to support the valve seat 106.

In other words, the diaphragm valve element 103 presses against the valve seat 106 to close the fluid control valve 100. Since the fluid control valve 100 is made of resin, the valve seat support part 120 supporting the valve seat 106 could be deformed or buckled. When the valve seat support part 120 is deformed, a valve-seat one end 106A of the valve seat 106 formed on an upper surface of the valve seat support part 120 is in an inclined state as shown in FIG. 11. To be specific, the valve-seat one end 106A is inclined by an angle $\theta$ with respect to an imaginary line connecting one end 116A before deformed and the other end 106B (indicated with a broken line in FIG. 11). Further, the one end 106A after deformed is moved by a distance X from the one end 116A before deformed.

When the valve seat support part 120 is deformed and the one end 106A of the valve seat 106 is inclined, the diaphragm valve element 103 and the one end 106A of the valve seat 106 are rubbed against each other, causing scratches on a sealing surface of the valve seat 106. Especially when the valve seat support part 120 is largely deformed and the one end 106A of the valve seat 106 is largely inclined, the sealing surface of the valve seat 106 is scratched. When the sealing surface of the valve seat 106 is scratched, it becomes a problem since the scratches may cause leakage of fluid.

Further, if the cylindrical valve seat support part has different strength in a circumferential direction, a low-strength portion of the valve seat support part is deformed when the valve seat is subjected to sealing load. Due to the deformation of the valve seat support part, only that deformed portion of the valve seat support part cannot obtain enough sealing load. Less sealing load causes a problem of the fluid leaking through that deformed portion.

For example, when a fluid control valve is in a high-temperature state due to a high-temperature fluid flowing therein, especially a resin fluid control valve tends to be easily deformed. Therefore, while the high-temperature fluid flows through the valve, when the sealing load is applied to the valve seat, the valve seat support part having less strength is deformed. This decreases reaction force of the valve seat support part and lowers the sealing strength of the valve seat. Thereby, when the high-temperature fluid flows in particular, the fluid is more likely to leak out. Furthermore, when the fluid pressure of the fluid is high, the fluid is more particularly liable to leak out.

The present invention has been made to solve the above problem and has a purpose of providing a fluid control valve to prevent inclination of a valve seat due to deformation of a valve seat support part caused when a diaphragm valve comes into contact with the valve seat.

Means of Solving the Problems

One aspect of the present invention to achieve the purpose provides a fluid control valve including: a resin valve body formed with a first passage and a second passage; a resin valve upper body connected to an upper surface of the resin valve body; and a resin diaphragm valve element held between the resin valve body and the resin valve upper body, the first passage having one end portion formed with a first port communication passage communicating with a first port and the other end portion formed with a first valve hole communication passage communicating with a valve hole, the first port communication passage and the first valve hole communication passage communicating with each other, the resin valve body including a valve seat support part between a valve chamber, the first port communication passage, and the first valve hole communication passage to support a valve seat, wherein the valve seat support part includes a valve seat reinforcement part, and the valve seat reinforcement part is formed to close a part of the first passage.

The fluid control valve having the above configuration is capable of reducing a deformation width of the valve seat support part buckled or deformed when the diaphragm valve comes into contact with the valve seat. Namely, the valve seat support part is reinforced by the valve seat reinforcement part, so that deformation of the valve seat support part is reduced and an inclination of the valve seat is reduced.

Further, less deformation of the valve seat support part leads to less inclination of a valve seat one end. The less inclination of the valve-seat one end results in a short rubbing width between the diaphragm valve element and the valve-seat one end. Thereby, the scratches to be made on the sealing surface of the valve-seat one end can be small. Specifically, even if the sealing surface is scratched, as long as a width of the scratches is narrow enough to be within a range of the sealing surface of the valve-seat one end, the fluid does not leak out through the scratches. Therefore, according to the present configuration, the valve-seat one end is less inclined, so that the scratches to be made are reduced in size within the range not exceeding the sealing surface of the valve seat. This makes it possible to prevent the fluid from leaking (through the scratches).

Further, since the valve seat support part having less strength is reinforced, the valve seat support part can have uniform strength in a circumferential direction. The strength of the valve seat support part is thus ensured, so that the valve seat support part having less strength can be prevented from being deformed when the valve seat is subjected to the sealing load. The thus achieved uniform sealing strength in the circumferential direction can prevent a decline in the sealing performance. This configuration is effective especially when high-temperature fluid flows and high-pressure fluid flows through the valve.

According to the above fluid control valve, preferably, the valve seat reinforcement part is a valve seat reinforcement upper part closing a part of the first valve hole communication passage when the valve hole is seen from a side of the resin valve upper body, and the valve seat reinforcement upper part is of a bow shape when the valve hole is seen from the side of the resin valve upper body.

The valve seat support part is thus reinforced and has the increased strength, reducing the deformation of the valve seat support part and reducing the inclination of the valve seat.

Specifically, the valve seat reinforcement upper part is formed in a bow shape on a first port side of the valve hole when seen from the side of the resin valve upper body. The valve seat on a second port side of the valve hole has large strength since the valve seat includes a support part vertically formed to separate the first passage and the second passage. On the other hand, the valve seat support part on the first port side of the valve hole has no support in a vertical direction since the first passage passes under the valve seat support part, and therefore the valve seat support part has less strength. In response to this, the reinforcement upper part is formed in such a weak portion so as to prevent the deformation of the valve seat support part. Accordingly, the inclination of the valve seat can be reduced.

Further, the valve seat reinforcement upper part is formed in the bow shape on the first port side of the valve hole so that the valve seat support part has the increased strength in the circumferential direction with respect to the valve hole. In other words, the valve seat reinforcement upper part of the bow shape is strongly connected to the cylindrical valve hole portion having sufficient strength. The valve seat reinforcement upper part is thus strongly connected to the valve hole portion, and thereby rigidity of the valve seat support part is increased by utilizing the rigidity of the cylindrical valve hole portion having enough strength. As a result, according to one result of the present embodiment which will be described in detail later, the deformation of the valve seat support part is reduced and the inclination of the valve seat can be reduced by 61 percent compared to the conventional fluid control valve.

The valve seat reinforcement upper part is formed to close the part of the first valve hole communication passage, but designed to minimize flow blockage of a fluid flowing in the passage. A fluid has characteristics of flowing straightforward. Therefore, the fluid flowing in the first valve hole communication passage flows in an outer circumferential side of an R (curved) portion of the passage. Thereby, the valve seat reinforcement upper part has little influence on the flow rate of the fluid even if the valve seat reinforcement upper part of the bow shape is formed on an inner circumferential side of the R portion. Thus, there is little influence on the flow rate of the fluid, and thereby the blocking of the fluid flowing in the first valve hole communication passage can be minimized.

According to the above fluid control valve, preferably, the valve seat reinforcement part is a valve seat reinforcement lower part to close a part of the first passage when the first port is seen from a side surface of the resin valve body, and the valve seat reinforcement lower part is of a bow shape when the first port is seen from the side surface of the resin valve body.

The valve seat support part is thus reinforced and increased in strength, so that the deformation of the valve seat support part can be reduced.

Specifically, the valve seat reinforcement lower part is formed in the bow shape on the valve seat support part side in the first passage when the valve hole is seen from the side surface of the resin valve body. Since the first passage is of a circular shape in cross section, a part of the circular cross sectional shape of the first passage is formed to be in the bow shape, thereby firmly fixing the valve seat reinforcement lower part. The thus firmly fixed valve seat reinforcement lower part can increase the strength of the valve seat support part, preventing plastic deformation of the valve seat support part. Therefore, according to one result of the present embodiment which will be described in detail later, in which the valve seat reinforcement lower part of the bow shape is formed on the valve seat support part side in the first passage, the deformation of the valve seat support part is reduced and the inclination of the valve seat can be reduced by 22 percent compared to the conventional fluid control valve.

According to the above fluid control valve, preferably, the valve seat reinforcement upper part and the valve seat reinforcement lower part form an almost L shape in section with respect to the valve seat support part.

Accordingly, the strength of both the valve seat reinforcement upper part and the valve seat reinforcement lower part can be utilized. Therefore, according to one result of the present embodiment which will be described in detail later, the deformation of the valve seat support part is reduced and the inclination of the valve seat can be reduced by 92 percent compared to the conventional fluid control valve.

Effects of the Invention

According to the above fluid control valve, it can be prevented that the valve seat is inclined due to the deformation of the valve seat support part caused when the diaphragm valve comes into contact with the valve seat.

MODE FOR CARRYING OUT THE INVENTION

Detailed embodiments of a fluid control valve according to the present invention are explained with reference to the accompanying drawings.

First Embodiment

Overall Configuration of Fluid Control Valve

Figure 1:
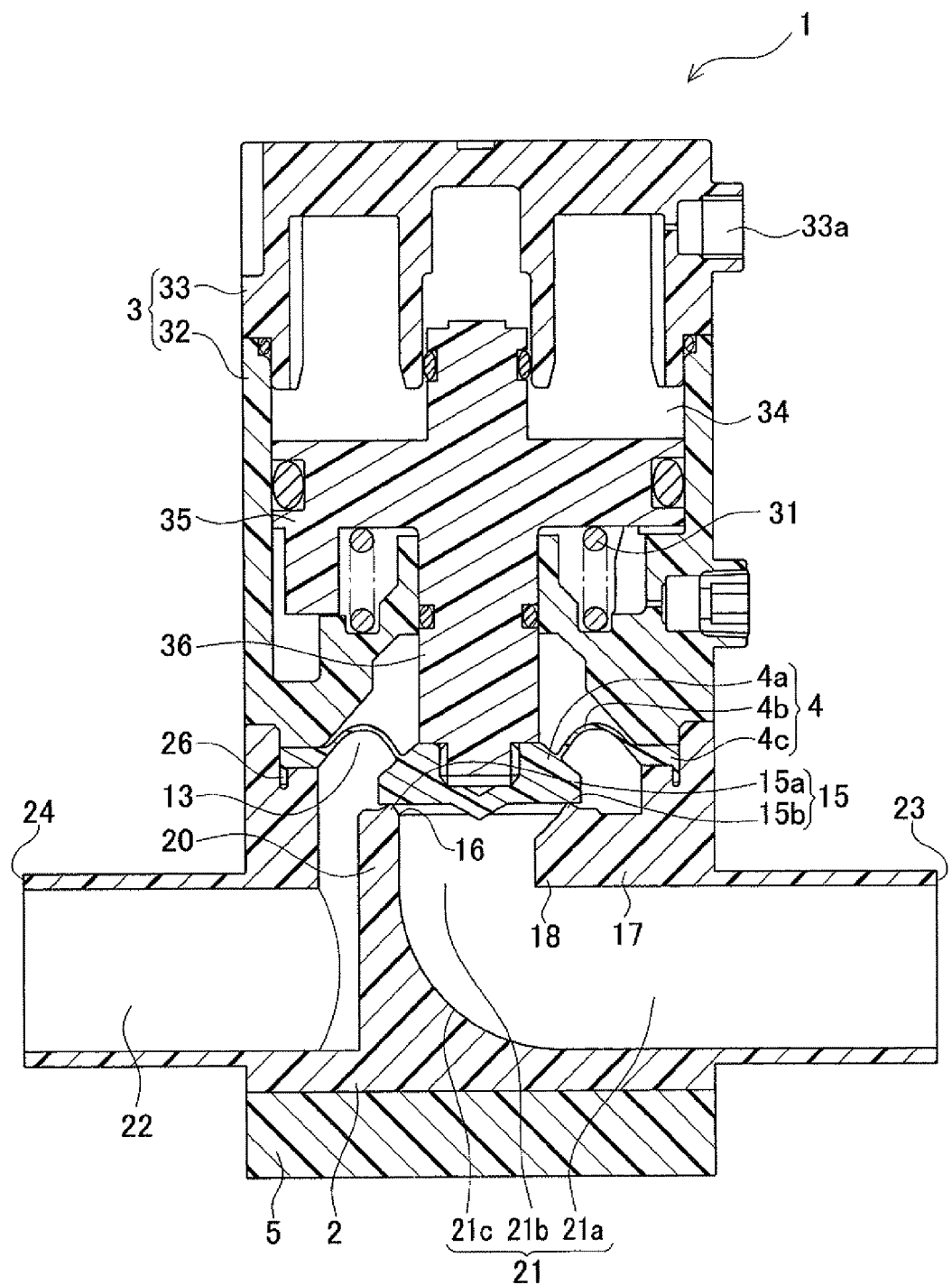
FIG. 1 is a sectional view of a fluid control valve in a valve-closed state according to a first embodiment of the present invention.
Figure 2:
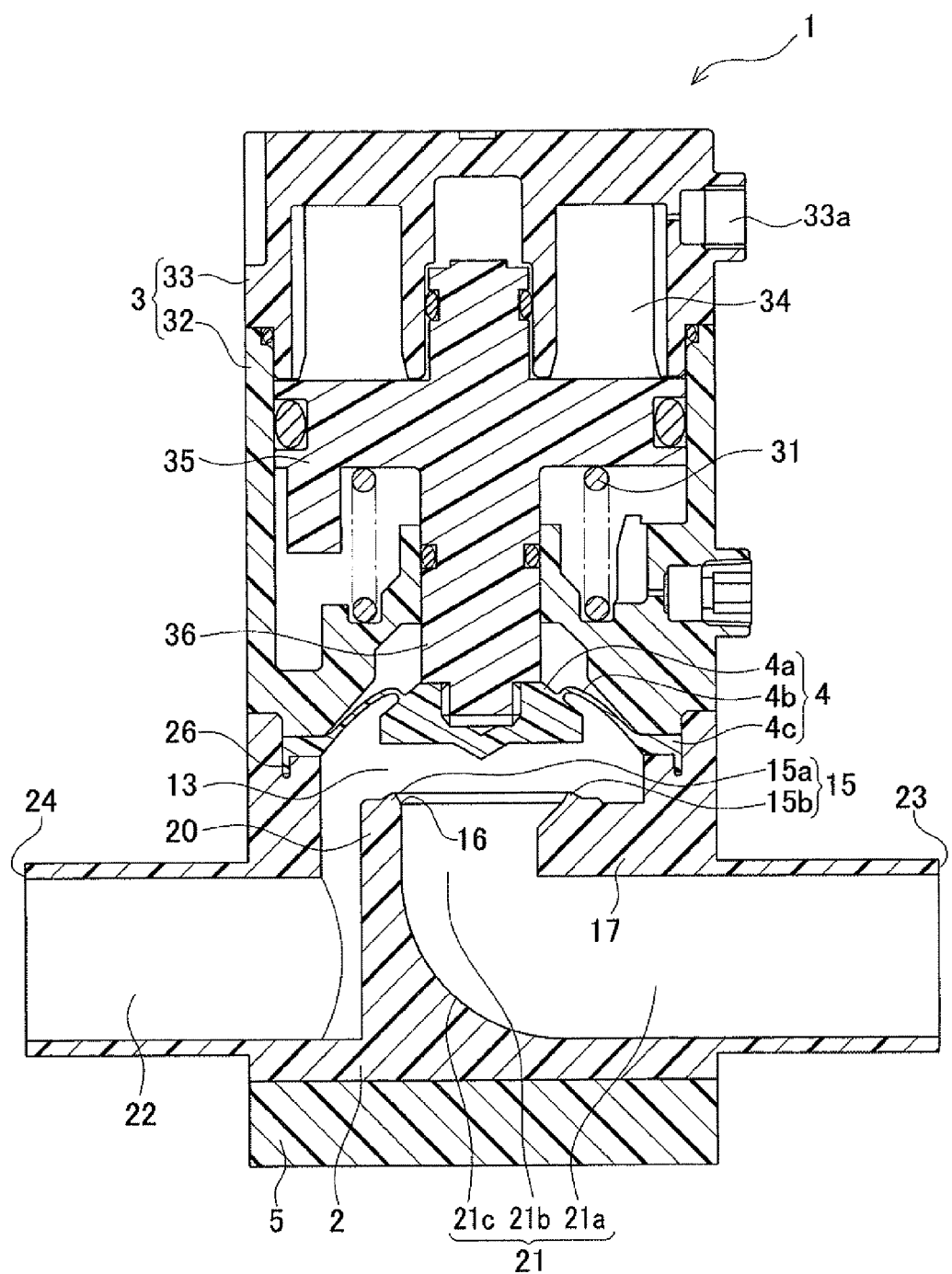
FIG. 2 is a sectional view of the fluid control valve in a valve-opened state according to the first embodiment of the present invention.
Figure 3:
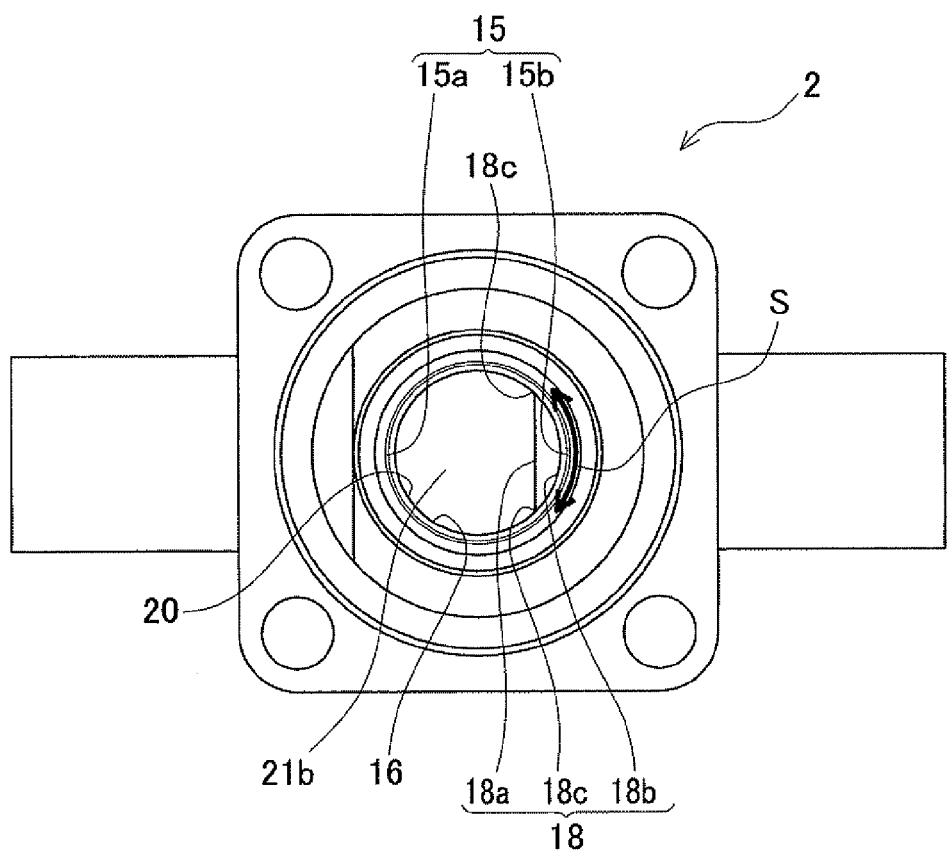
FIG. 3 is a top view of a resin valve body according to the first embodiment of the present invention.

FIG. 1 is a sectional view of a fluid control valve 1 in a valve-closed state according to a first embodiment. FIG. 2 is a sectional view of the fluid control valve 1 in a valve-opened state according to the first embodiment. FIG. 3 is a top view of a resin valve body 2.

The fluid control valve 1 of the first embodiment is, as similar to the related art, attached to a semiconductor manufacturing apparatus to supply chemical liquid. The fluid control valve 1 is an air-operated open/close valve of a normally opened type. The fluid control valve 1 is configured in a manner that a resin valve upper body 3 is connected to an upper surface of the resin valve body 2, and a diaphragm valve element 4 is held between the valve body 2 and the valve upper body 3. The fluid control valve 1 is arranged to slide a piston 35 inside the valve upper body 3 to bring the diaphragm valve element 4 into or out of contact with a valve seat 15. The fluid control valve 1 is provided with a mounting plate 5 fixed to a lower surface of the valve body 2 to be attached to the semiconductor manufacturing apparatus.

<Configuration of Resin Valve Body>

The resin valve body 2 is made of resin having excellent corrosion resistance and thermal resistance such as PTFE (polytetrafluoroethylene) and PFA (tetrafluoroethylene-perfluoroalkyl vinyl ether copolymer).

As shown in FIG. 1, on the upper surface of the resin valve body 2, a valve chamber 13 is formed in a columnar shape. The valve chamber 13 communicates with one end of a first passage 21 communicating with a first port 23 of a circular shape and also communicates with one end of a second passage 22 communicating with a second port 24 of a circular shape. A valve hole 16 is formed in a portion where the first passage 21 is opening in the valve chamber 13. The valve seat 15 is integrally formed in a surrounding portion of the valve hole 16.

The first passage 21 has one end portion formed with a first port communication passage 21a communicating with the first port 23 and the other end portion formed with a first valve hole communication passage 21b communicating with the valve chamber 13. The first port communication passage 21a is axially formed with respect to a center of the first port 23. The first valve hole communication passage 21b is formed in an axial direction of the valve hole 16. The first port communication passage 21a and the first valve hole communication passage 21b are vertically connected inside the resin valve body 2, and an R portion 21c is formed in a connecting part.

As shown in FIG. 1, a valve seat support part 17 to support the valve seat 15 is formed between the valve chamber 13, the first port communication passage 21a, and the first valve hole communication passage 21b. The valve seat support part 17 includes a valve seat reinforcement upper part 18. As shown in FIG. 3, the valve seat reinforcement upper part 18 is formed inside the valve hole communication passage 21b when seen from the upper surface of the resin valve body 2. As shown in FIG. 3, when seen from the upper surface of the resin valve body 2, the valve seat reinforcement upper part 18 is formed in a bow shape having a string 18a and an arc 18b. The string 18a and the arc 18b are continuous to each other at contact points 18e. A cross-sectional area of the valve seat reinforcement upper part 18 shown in FIG. 3 is obtained by the formula of a bow-shape area.

As shown in FIG. 3, the valve hole 16 in which the valve seat reinforcement upper part 18 is formed takes the shape of a passage having an almost D shape in section. As shown in FIG. 1, the valve seat reinforcement upper part 18 is chamfered at 45 degrees from the valve seat 15 toward the first valve hole communication passage 21b in the present embodiment. By this chamfer, the flow rate of fluid flowing into the valve hole 16 can be increased.

A valve-seat other end 15a of the valve hole 16 on a second passage 22 side is supported by a support part 20 formed vertically to separate the first passage 21 and the second passage 22. The valve seat 15 is cylindrically supported by the support part 20 and the valve seat support part 17. Other portion of the valve seat 15 than a portion supported by the valve seat support part 17 is supported by the support part 20.

<Configuration of Resin Valve Upper Body>

The resin valve upper body 3 shown in FIG. 1 is made from resin having corrosion resistance and rigidity such as PPS (polyphenylene sulfide), PFA, PP, and PVDF. The valve upper body 3 consists of a cylinder 32 and a cover 33 to form a piston chamber 34. The resin-made piston 35 is slidably mounted in the piston chamber 34 and continuously urged upward in the figure by a restoring spring 31 placed between the piston chamber 34 and the cylinder 32 in a contracting manner. The piston 35 is moved inside the piston chamber 34 in a vertical direction in the figure according to the balance between pressure of operation air supplied to the piston chamber 34 through an operation port 33a and reaction force of the restoring spring 31. The piston 35 is integrally formed with a piston rod 36. The piston rod 36 integrally formed with the piston 35 is able to slide along the cylinder 32 and connected to the diaphragm valve element 4.

<Configuration of Diaphragm Valve>

The diaphragm valve element 4 is made of resin having excellent corrosion resistance and thermal resistance such as PTFE (polytetrafluoroethylene) and formed by cutting. The diaphragm valve element 4 includes a columnar valve body part 4a to be brought into contact with or separated from the valve seat 15, a web part 4b joined to an outer circumferential surface of the valve body part 4a, and a peripheral edge part 4c formed to be thick and extend along an outer periphery of the web part 4b. The diaphragm valve element 4 is fixed in a manner that the peripheral edge part 4c is held between the resin valve body 2 and the resin valve upper body 3 and sealed by an inner wall of an annular groove 26.

<Operational Effects of Fluid Control Valve>

(Input and Output of Fluid)

As shown in FIG. 2, in the fluid control valve 1, the first port 23 is connected to the first passage 21 and the second port 24 is connected to the second passage 22. While the operation air is not supplied to the operation port 33a in the fluid control valve 1, the diaphragm valve element 4 is held separated from the valve seat 15 by the force of the restoring spring 31. Therefore, the fluid flowing into the first passage 21 through the first port 23 is supplied to the valve chamber 13 and the second passage 22 via the valve hole 16 and then output to the second port 24.

On the other hand, as shown in FIG. 1, when the operation air is supplied to the operation port 33a in the fluid control valve 1, the piston 35 is moved downward to bring the diaphragm valve element 4 into contact with the valve seat 15. Thereby, the chemical liquid flowing into the valve hole 16 via the first passage 21 through the first port 23 is blocked off at the valve seat 15 by the diaphragm valve 4 and not output to the second port 24 from the second passage 22.

(Effects of Valve Seat Reinforcement Part)

Figure 10:
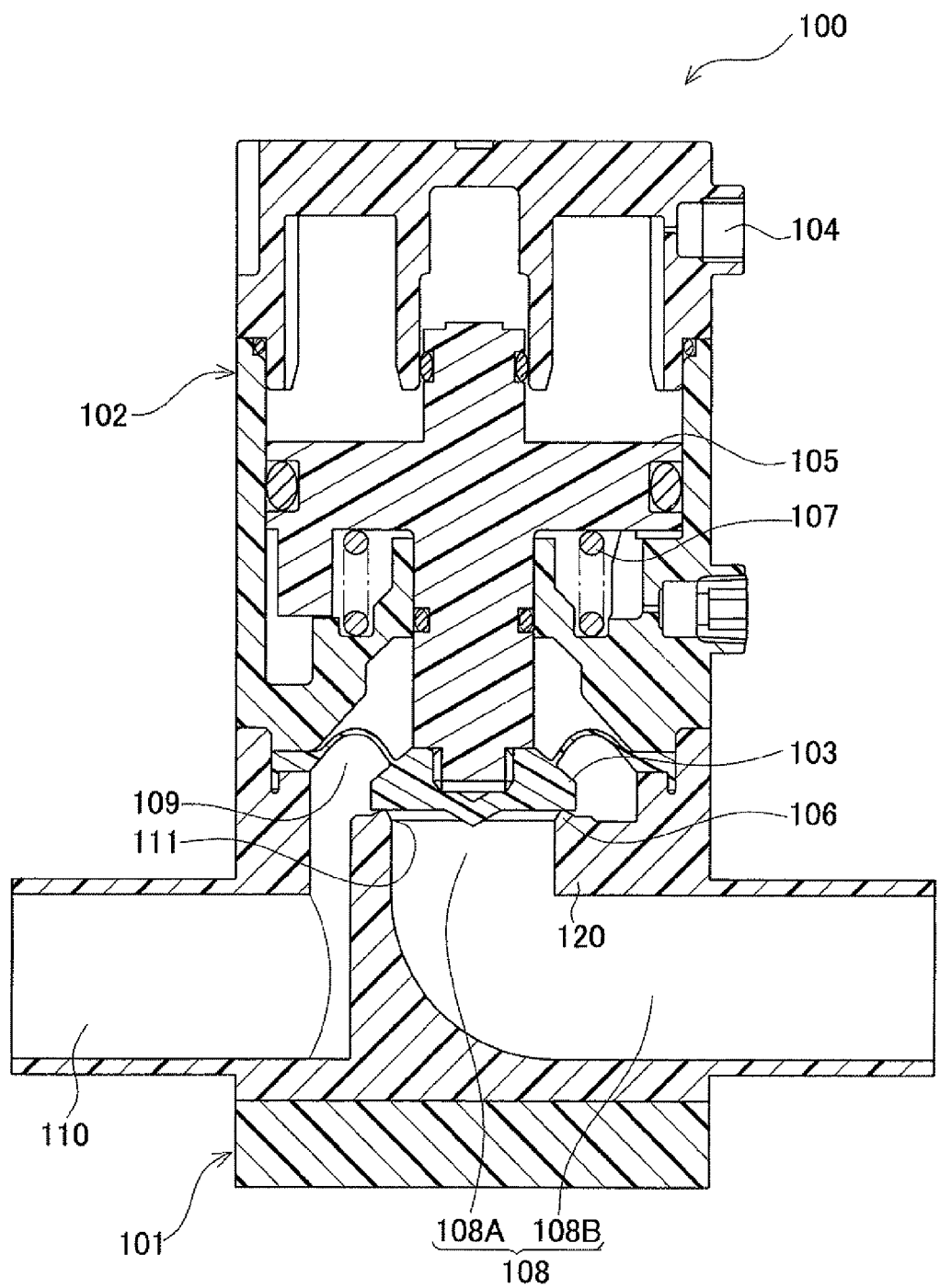
FIG. 10 is a sectional view of a fluid control valve in a valve-closed state according to the related art.
Figure 11:
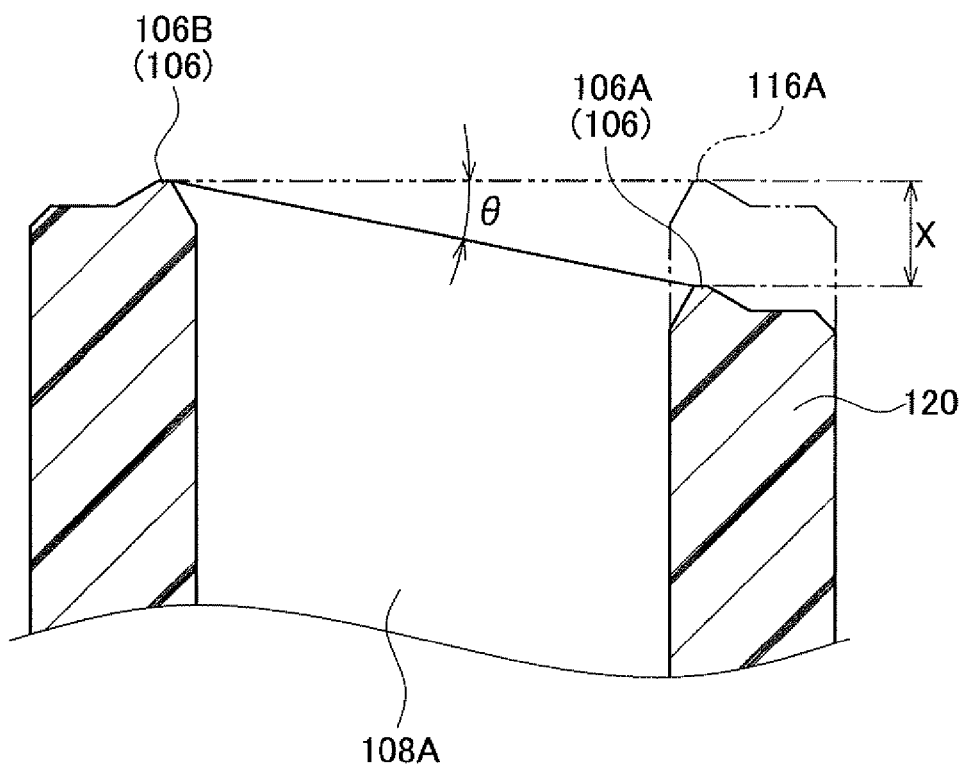
FIG. 11 is a partially enlarged conceptual diagram of a valve portion of the fluid control valve according to the related art.

The fluid control valve 1 is arranged to control the flow rate of the fluid by bringing the above mentioned diaphragm valve element 4 into or out of contact with the valve seat 15. The diaphragm valve element 4 presses the valve seat 15 downward, and thereby the valve seat support part 17 supporting the valve seat 15 is subjected to load. As a result, in the conventional fluid control valve 100 shown in FIG. 10, the valve seat support part 120 is deformed by the load. When the valve seat support part 120 is deformed, the valve-seat one end 106A of the valve seat 106 formed on the upper surface of the valve seat support part 120 is inclined as shown in FIG. 11. Specifically, the valve seat one end 106A is inclined by an angle θ relative to the line connecting the valve-seat one end 116A before deformed and the valve-seat other end 106B after deformed (indicated with a double chain line in FIG. 11). Further, the valve-seat one end 106A is inclined by the distance X from the valve-seat one end 116A due to the deformation. The valve seat support part 120 is deformed and the valve-seat one end 106A is inclined, so that the diaphragm valve 103 and the valve-seat one end 106A are rubbed against each other, causing scratches on the sealing surface of the valve-seat one end 106A. Especially when the valve seat support part 120 is largely deformed and the valve-seat one end 106A is largely inclined, the valve-seat one end 106A is suffered from the scratches on the sealing surface. The scratches on the sealing surface of the valve-seat one end 106A could be a problem since the fluid could leak out through the scratches.

On the other hand, according to the present embodiment, the valve seat support part 17 includes the valve seat reinforcement upper part 18. Therefore, it is possible to reduce the deformation width of the valve seat support part 17 deformed when the diaphragm valve element 4 presses against the valve seat 15. Namely, the valve seat support part 17 is reinforced by the valve seat reinforcement upper part 18, and thereby the deformation can be reduced since the valve seat support part 17 can counteract the downward pressing force even if the diaphragm valve element 4 downwardly presses the valve seat 15.

Since the deformation width of the valve seat support part 17 is reduced, the inclination width of the valve-seat one end 15b can also be decreased. The valve-seat one end 15b is less inclined, so that the rubbing width of the diaphragm valve element 4 and the valve-seat one end 15b is made small. As a result, the scratches on the sealing surface of the valve-seat one end 15b become small. To be specific, even if the valve-seat one end 15b is scratched in a direction orthogonal to a circumferential direction of the sealing surface, the fluid does not leak out through the scratches as long as the scratches are formed within an area of the sealing surface of the valve-seat one end 15b. Therefore, according to the present embodiment, the less inclination of the valve-seat one end 15b can limit the scratches within a range of the sealing surface of the valve-seat one end 15b, thus preventing the leakage of the fluid.

Further, the less deformation of the valve seat support part 17 prevents plastic deformation of the valve seat support part 17 due to a repetitive fatigue. Since the plastic deformation of the valve seat support part 17 can be prevented, the sealing performance between the diaphragm valve element 4 and the valve seat 15 can be maintained uniform over an entire circumference. The sealing performance maintained uniform can prevent the leakage of the fluid.

Since the deformation of the valve seat support part 17 is prevented, the scratches larger than the sealing surface of the valve seat 15 can be prevented. Therefore, the number of times to replace the fluid control valve 1 can be reduced, achieving cost reduction. Further, since the valve seat support part 17 is prevented from the plastic deformation, the uniformity of the sealing performance can be maintained.

Figure 7:
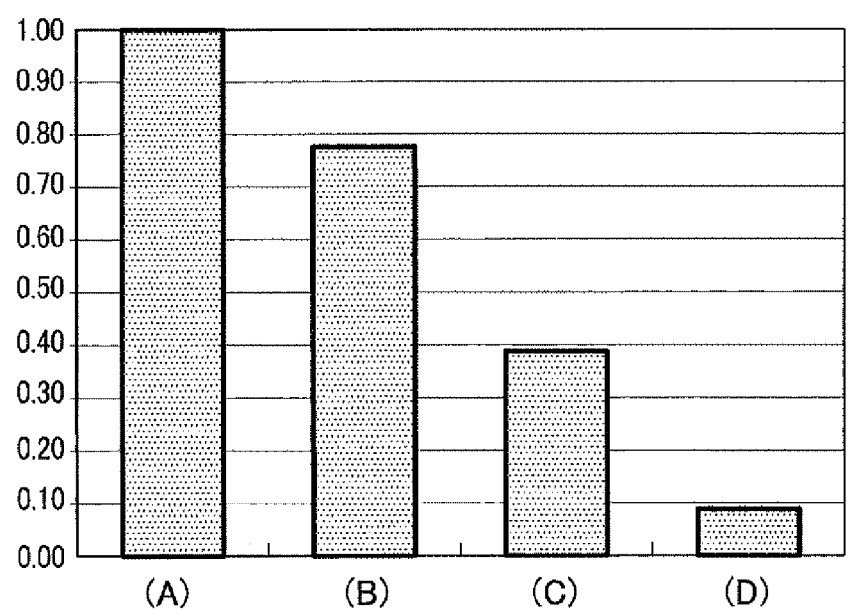
FIG. 7 is a graph showing experiment results obtained by comparison between inclination of a valve seat of a fluid control valve according to a related art and inclination of a valve seat of a fluid control valve according to each embodiment of the present invention.

FIG. 7 is a bar graph showing an effect of the present invention regarding inclination of a valve seat. A vertical axis indicates a ratio of an inclination angle of the present invention compared with the inclination angle θ of the fluid control valve 100 on condition that the ratio of the inclination angle θ of the valve-seat one end 106A of the fluid control valve 100 of the related art is defined as "1." On a horizontal axis, (A) indicates the ratio of the inclination angle θ of the valve-seat one end 106A of the fluid control valve 100, and (C) indicates a ratio of an inclination angle of the valve-seat one end 15b of the fluid control valve 1 of the present embodiment.

As shown in FIG. 7, comparing with the ratio of the inclination angle θ of the valve-seat one end 106A of the fluid control valve 100 in (A), the ratio of the inclination angle of the valve-seat one end 15b of the fluid control valve 1 of the present embodiment in (C) is 0.39. Namely, the valve seat support part 17 of the fluid control valve 1 including the valve seat reinforcement upper part 18 could reduce the inclination of the valve seat by 61 percent.

Further, the valve seat reinforcement upper part 18 has the bow shape when the valve hole 16 is seen from the side of the resin valve upper body 3, reinforcing the valve seat support part 17 and increasing the strength thereof, so that the deformation width of the valve seat support part 17 can be decreased and the inclination angle of the valve-seat one end 15b can be reduced.

To be specific, the bow-shaped valve seat reinforcement upper part 18 is formed on a side of the first port communication passage 21a in the valve hole 16 when the valve hole 16 is seen in the direction of the resin valve upper body 3. The valve-seat other end 15a located on the second passage 22 side of the valve hole 16 has large strength since the support part 20 is formed in a vertical direction to separate the first passage 21 and the second passage 22. On the contrary, the valve seat support part 17 on the first port communication passage 21a side of the valve hole 16 has less strength in the vertical direction since the first passage 21 passes under the valve seat support part 17. Therefore, the deformation of the valve seat support part 17 can be prevented by the valve seat reinforcement upper part 18 formed in a portion having less strength. Thereby, the inclination of the valve seat 15 can be reduced.

Further, the valve seat reinforcement upper part 18 is formed in a bow shape on the first port communication passage 21a side of the valve hole 16, so that the valve seat support part 17 can be strengthened in a circumferential direction S with respect to the valve hole 16 as shown in FIG. 3. In other words, the valve seat reinforcement upper part 18 is of the bow shape, and thereby the valve seat reinforcement upper part 18 is strongly connected to the cylindrical valve hole 16 having the strength. The valve seat reinforcement upper part 18 is thus strongly connected to the valve hole 16, and thereby the rigidity of the valve seat support part 17 can be increased by utilizing the rigidity of the cylindrical valve hole 16 having the strength by the support part 20. Consequently, the deformation of the valve seat support part 17 is reduced and the inclination of the valve seat 15 can be reduced by 61 percent compared with the conventional fluid control valve 100.

The valve seat reinforcement upper part 18 is formed to close a part of the first valve hole communication passage 21b, but designed to minimize the flow blockage of the fluid. A fluid has characteristics of flowing straightforward, and thereby the fluid flowing in the first valve hole communication passage 21b mainly flows in an outer circumferential side of the R (curved) portion 21c of the passage. Therefore, there is less influence on the flow rate of the fluid even if the bow-shaped valve seat reinforcement upper part 18 is formed in an inner circumferential side of the R portion 21c. As a result, it can be minimized to block the fluid flowing in the first valve hole communication passage 21b.

Further, the valve seat support part 17 having less strength is reinforced, and thereby the valve seat support part 17 and the support part 20 can maintain the uniform strength in the circumferential direction. Since the strength of the valve seat support part 17 is maintained, the valve seat support part 17 having less strength is prevented from being deformed when the valve seat 15 is subjected to the sealing load. Decrease in the sealing performance can be prevented since the uniform sealing force in the circumferential direction is achieved. The present embodiment is especially effective in a high-temperature state and when excessive sealing load is applied to a valve seat.

Second Embodiment

Configuration of Resin Valve Body

Figure 4:
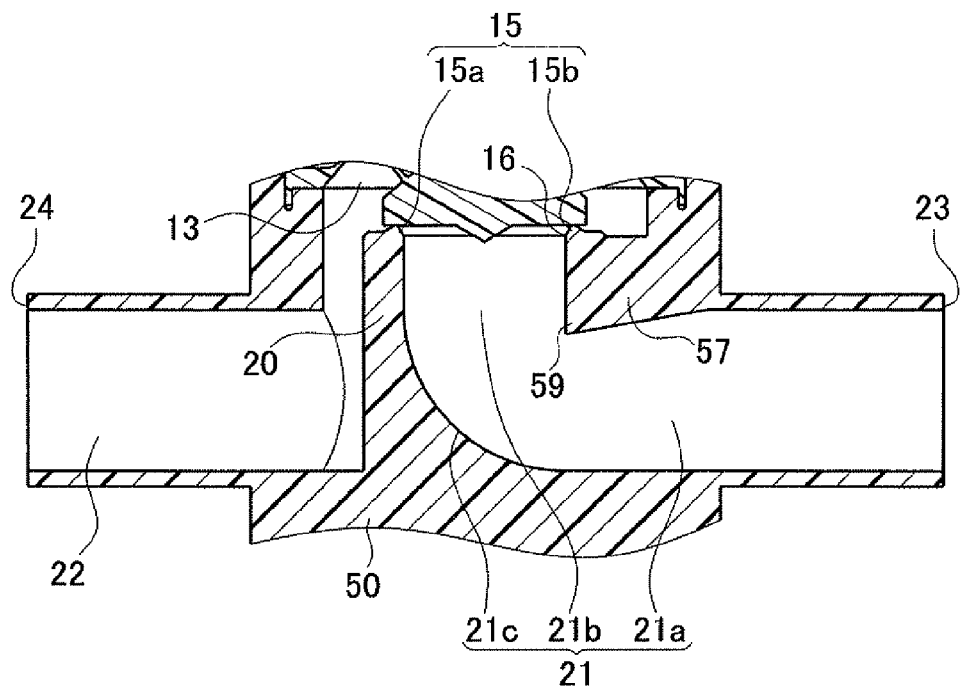
FIG. 4 is a partially enlarged sectional view of a fluid control valve according to a second embodiment of the present invention.
Figure 5:
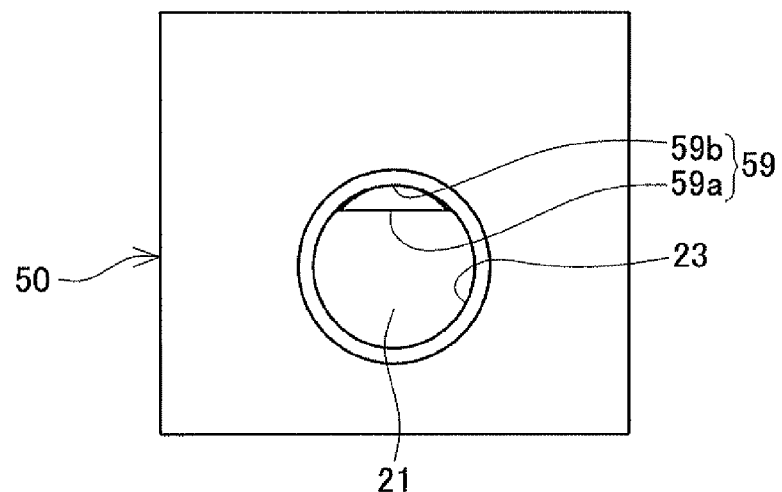
FIG. 5 is a partially enlarged side view of the fluid control valve according the second embodiment of the present invention.

FIG. 4 is a sectional view of a resin valve body 50. FIG. 5 is a side view of the resin valve body 50.

In a second embodiment, only the configuration of the valve seat support part 17 of the resin valve body 2 is different from the fluid control valve 1 of the first embodiment, and other structure is same with the first embodiment. Therefore, a valve seat support part 57 of the resin valve body 50 in the second embodiment, which is a modification of the valve seat support part 17 of the valve body 2 in the first embodiment, is mainly explained with reference to FIGS. 4 and 5, and other configuration is omitted with its explanation by applying the same reference signs with the first embodiment.

As shown in FIG. 4, between a valve chamber 13, a first port communication passage 21a, and a first valve hole communication passage 21b, the valve seat support part 57 supporting a valve seat 15 is formed. The valve seat support part 57 includes a valve seat reinforcement lower part 59. As shown in FIG. 5, when a first passage 21 is seen from a right side of a first port 23, the valve seat reinforcement lower part 59 is formed in the first port communication passage 21a. The valve seat reinforcement lower part 59 is formed in a bow shape having a string 59a and an arc 59b. A sectional area of the bow-shaped valve seat reinforcement lower part 59 is obtained by the formula of a bow-shape area. The area of the bow-shaped valve seat reinforcement lower part 59 accounts for about 10 percent of an area of a first port 23 when the first port 23 is of a circular shape.

As shown in FIG. 5, the first port communication passage 21a is of an almost D shape in section since the valve seat reinforcement lower part 59 is formed in the passage.

<Operational Effects of Fluid Control Valve>

Operational effects of an input and an output of a fluid is similar to that of the fluid control valve 1 of the first embodiment, and therefore the explanation is omitted.

(Effects of Valve Seat Reinforcement Part)

According to the present embodiment, the valve seat support part 57 includes the valve seat reinforcement lower part 59. Thereby, the valve seat support part 57 is reinforced and the strength is increased, so that a deformation width of the valve seat support part 57 is reduced and an inclination angle of a valve-seat one end 15b is reduced.

To be specific, the valve seat reinforcement lower part 59 of the bow shape is formed on the valve seat support part 57 side in the first port communication passage 21a when a valve hole 16 is seen from a side surface of the resin valve body 50. Since a first passage 21 is of a circular shape in cross section, a part of the circular cross sectional shape is continuous to be the bow shape, thereby firmly fixing the valve seat reinforcement lower part 59. The thus firmly fixed valve seat reinforcement lower part 59 can increase the strength of the valve seat support part 57, and thereby the deformation width of the valve seat support part 57 can be reduced. Accordingly, the bow-shaped valve seat reinforcement lower part 59 formed on the valve seat support part 57 side in the first port communication passage 21a can increase the strength of the valve seat support part 57.

FIG. 7 is a bar graph showing an effect of the present invention regarding inclination ratio of a valve seat. A vertical axis indicates a ratio of an inclination angle of the present invention compared with a ratio of the inclination angle θ of the valve-seat one end 106A of the fluid control valve 100 on condition that the ratio of the inclination angle θ of the valve-seat one end 106A of the fluid control valve 100 is defined as "1." On a horizontal axis, (A) indicates the ratio of the inclination angle θ of the valve-seat one end 106A of the fluid control valve 100, and (B) indicates a ratio of an inclination angle of the valve-seat one end 15b of the fluid control valve according to the present embodiment.

As shown in FIG. 7, comparing with the ratio of the inclination angle θ of the valve-seat one end 106A of the fluid control valve 100 in (A), the ratio of the inclination angle of the valve-seat one end 15b of the fluid control valve of the present embodiment in (B) is 0.78. Namely, the valve seat support part 57 of the fluid control valve including the valve seat reinforcement lower part 59 could reduce the inclination of the valve seat support part 57 by 22 percent.

Third Embodiment

Configuration of Resin Valve Body

Figure 6:
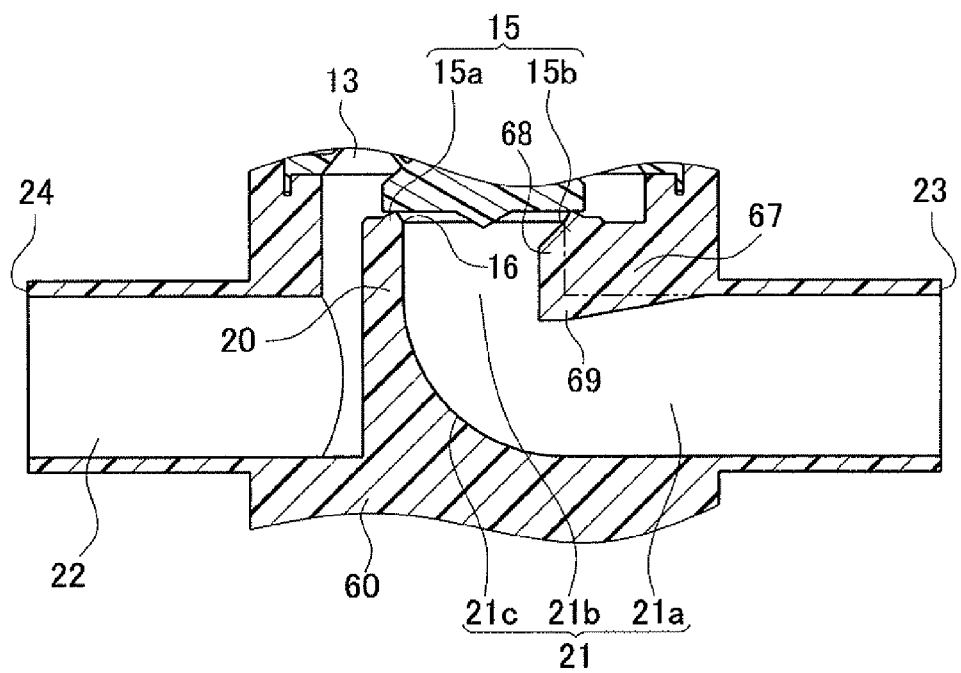
FIG. 6 is a partially enlarged sectional view of a fluid control valve according to a third embodiment of the present invention.

FIG. 6 is a sectional view of a resin valve body 60.

In a third embodiment, only the configuration of the valve seat support part 17 of the resin valve body 2 in the fluid control valve 1 of the first embodiment is different and other structure is same with the first embodiment. Therefore, a valve seat support part 67 of a resin valve body 60 of the third embodiment, which is a modification of the valve seat support part 17 of the resin valve body 2 of the first embodiment, is mainly explained with reference to FIG. 6, and other structure is omitted with its explanation by applying the same reference signs with the first embodiment.

As shown in FIG. 6, between a valve chamber 13, a first port communication passage 21a, and a first valve hole communication passage 21b, the valve seat support part 67 is formed to support a valve seat 15. The valve seat support part 67 includes a valve seat reinforcement upper part 68 and a valve seat reinforcement lower part 69. As shown in FIG. 6, a valve seat reinforcement part formed by the valve seat reinforcement upper part 68 and the valve seat reinforcement lower part 69 is of an almost L shape in cross section with respect to the valve seat support part 67. In FIG. 6, the valve seat reinforcement upper and lower parts 68 and 69 are illustrated separately from the valve seat support part 67 so that it is easily understood that the valve seat reinforcement upper and lower parts 68 and 69 are of an almost L shape in section with respect to the valve seat support part 67. There is a case that the valve seat reinforcement upper and lower parts 68 and 69 are integrally formed with the valve seat support part 67 and the L shape is hard to be recognized.

The configuration of the valve seat reinforcement upper part 68 is similar to that of the valve seat reinforcement upper part 18 of the first embodiment. Further, the configuration of the valve seat reinforcement lower part 69 is similar to that of the valve seat reinforcement lower part 59 of the second embodiment. Therefore, a detailed explanation is omitted.

<Operational Effects of Fluid Control Valve>

Operational effects of an input and an output of a fluid is similar to the fluid control valve 1 of the first embodiment, and therefore the explanation thereof is omitted.

(Effects of Valve Seat Reinforcement Part)

According to the present embodiment, the valve seat reinforcement upper and lower parts 68 and 69 form the almost L shape in section with respect to the valve seat support part 67, so that the strength of both the valve seat reinforcement upper and lower parts 68 and 69 can be utilized. Therefore, the strength of the valve seat support part 67 can be increased compared to the conventional fluid control valve 100. In other words, the valve seat support part 67 formed with the valve seat reinforcement upper and lower parts 68 and 69 can maintain further strength than before and reduce the deformation width. Accordingly, the inclination of the valve-seat one end 15b is reduced, and thereby unevenness of the sealing between the diaphragm valve element 4 and the valve seat 15 can be prevented.

FIG. 7 is a bar graph showing an effect of preventing inclination of a valve seat of the present invention. A vertical axis indicates an inclination ratio of the present invention compared with the fluid control valve 100 of the related art on condition that the inclination ratio of the fluid control valve 100 is defined as "1." On a horizontal axis, (A) indicates the inclination ratio of the valve-seat one end 106A of the fluid control valve 100, and (D) indicates an inclination ratio of the valve-seat one end 15b of the fluid control valve in the present embodiment.

As shown in FIG. 7, comparing with the inclination of the valve-seat one end 106A of the fluid control valve 100 in (A), the inclination ratio of the valve-seat one end 15b of the fluid control valve of the present embodiment in (D) is 0.08. Namely, the valve seat support part 67 of the fluid control valve including the valve seat reinforcement upper and lower parts 68 and 69 could reduce the inclination of the valve seat support part 67.

Forth Embodiment

Configuration of Resin Valve Body

Figure 8:
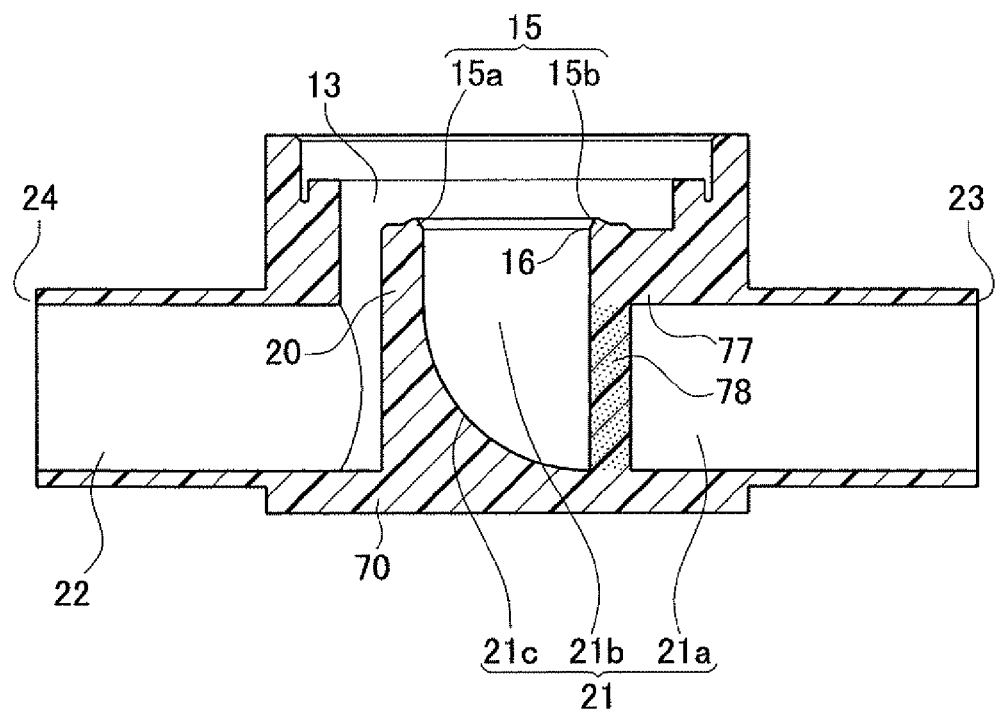
FIG. 8 is a partially enlarged sectional view of a fluid control valve according to a forth embodiment of the present invention.
Figure 9:
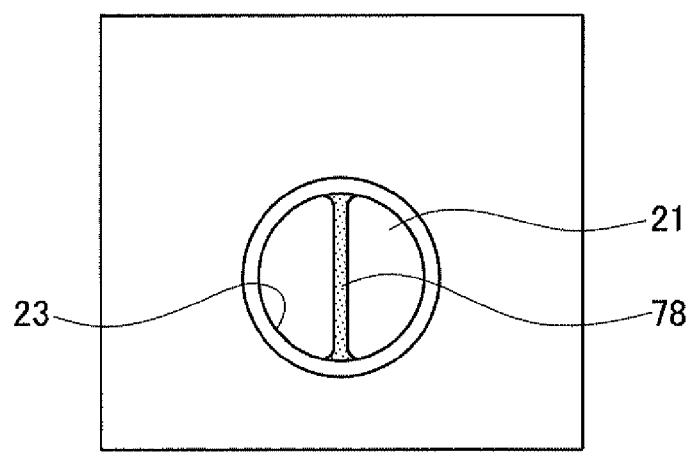
FIG. 9 is a partially enlarged side view of the fluid control valve according to the forth embodiment of the present invention.

FIG. 8 is a sectional view of a resin valve body 70. FIG. 9 is a side view of the resin valve body 70.

In a forth embodiment, only the configuration of the valve seat support part 17 of the resin valve body 2 of the fluid control valve 1 in the first embodiment is different, and other structure is same with the first embodiment. Therefore, a valve seat support part 77 of the resin valve body 70 of the forth embodiment, which is a modification of the valve seat support part 17 of the resin valve body 2 of the first embodiment, is mainly explained with reference to FIGS. 8 and 9, and other structure is omitted with its explanation by applying the same reference signs with the first embodiment.

As shown in FIG. 8, between a valve chamber 13, a first port communication passage 21a, and a first valve hole communication passage 21b, the valve seat support part 77 is formed to support a valve seat 15. The valve seat support part 77 includes a valve seat reinforcement part 78. As shown in FIG. 9, when seen from a right side of the resin valve body 70, the valve seat reinforcement part 78 is formed in the first port communication passage 21a. Specifically, the valve seat reinforcement part 78 is formed in an axial direction of the first port communication passage 21a to reinforce the valve seat support part 77. The valve seat reinforcement part 78 of a bar-like streamline shape is formed in an elliptic shape in cross section so that a fluid is allowed to flow easily in a radial direction. Because of this streamline shape with the sectional elliptic shape, the valve seat reinforcement part 78 rarely blocks the flow of the fluid when the fluid flows through a first passage 21 to a second passage 22 and vice versa.

<Operational Effects of Fluid Control Valve>

Operational effects of an input and an output of fluid is same with the fluid control valve 1 of the first embodiment, and thereby the explanation thereof is omitted.

(Effects of Valve Seat Reinforcement Part)

According to the present embodiment, the valve seat support part 77 includes the valve seat reinforcement part 78. Accordingly, the strength of the valve seat support part 77 is increased, and thereby the valve-seat one end 15b is prevented from sinking due to the deformation of the valve seat 15.

Further, the valve seat reinforcement part 78 serves as a holding bar to directly support the valve seat support part 77. Therefore, the valve seat support part 77 is directly supported, so that the strength of the valve seat support part 77 can be directly increased.

The present invention is not limited to the above mentioned embodiments and can be modified in various ways without departing from the scope of the invention.

For instance, a valve seat reinforcement upper part for reinforcing a valve seat support part may be of a crescent bow shape. The valve seat reinforcement upper part of the crescent bow shape widens a first passage, and thereby the fluidity of the fluid flowing through the passage can be improved.

For instance, in the present embodiment, a valve seat reinforcement upper part and a valve seat reinforcement lower part are formed integrally with a valve seat support part. Metal or the like may be included inside the valve seat reinforcement upper and lower parts. By including metal or the like, the valve seat reinforcement upper and lower parts can increase the strength compared with the resin valve seat reinforcement upper and lower parts. The valve seat reinforcement upper and lower parts are externally exposed if they are integrally formed with the valve seat support part, but the material is not exposed outside. When the valve seat support part is integrally formed with the valve seat reinforcement upper and lower parts, a portion protruding from the first passage and closing the passage is defined as the valve seat reinforcement upper and lower parts in the conventional fluid control valve.

REFERENCE SIGNS LIST

1 Fluid control valve
13 Valve chamber
15 Valve seat
16 Valve hole
17 Valve seat support part
18, 68 Valve seat reinforcement upper part
59, 69 Valve seat reinforcement lower part
2 Resin valve body
21 First passage
21a First port communication passage
21b First valve hole communication passage
23 First port
24 Second port
3 Resin valve upper body
4 Diaphragm valve element

The invention claimed is:

1. A fluid control valve including:
a resin valve body formed with a first passage and a second passage;
a resin valve upper body connected to an upper surface of the resin valve body; and
a resin diaphragm valve element held between the resin valve body and the resin valve upper body,
wherein the first passage comprising one end portion formed with a first port communication passage communicating with a first port and one other end portion formed with a first valve hole communication passage communicating with a valve hole, the first port communication passage and the first valve hole communication passage communicating with each other,
wherein the resin valve body including a valve seat support part between a valve chamber, the first port communication passage, and the first valve hole communication passage to support a valve seat,
wherein the valve seat support part includes a valve seat reinforcement part,
wherein the valve seat reinforcement part is formed to close a part of the first passage,
wherein the valve seat reinforcement part is a valve seat reinforcement upper part closing a part of the first valve hole communication passage when the valve hole is seen from a side of the resin valve upper body, and
wherein the valve seat reinforcement upper part is of a bow shape when the valve hole is seen from the side of the resin valve upper body.

2. The fluid control valve according to claim 1, wherein:
the valve seat reinforcement part is a valve seat reinforcement lower part to close a part of the first passage when the first port is seen from a side surface of the resin valve body, and
the valve seat reinforcement lower part is of a bow shape when the first port is seen from the side surface of the resin valve body.

3. A fluid control valve including:
a resin valve body formed with a first passage and a second passage;
a resin valve upper body connected to an upper surface of the resin valve body; and
a resin diaphragm valve element held between the resin valve body and the resin valve upper body,
wherein the first passage comprising one end portion formed with a first port communication passage communicating with a first port and one other end portion formed with a first valve hole communication passage communicating with a valve hole, the first port communication passage and the first valve hole communication passage communicating with each other,
wherein the resin valve body including a valve seat support part between a valve chamber the first port communication passage, and the first valve hole communication passage to support a valve seat,
wherein the valve seat support part includes a valve seat reinforcement part,
wherein the valve seat reinforcement part is formed to close a part of the first passage,
wherein the valve seat reinforcement part is a valve seat reinforcement upper part closing a part of the first valve hole communication passage when the valve hole is seen from a side of the resin valve upper body,
wherein the valve seat reinforcement upper part is of a bow shape when the valve hole is seen from the side of the resin valve upper body,
wherein the valve seat reinforcement part is a valve seat reinforcement lower part to close a part of the first passage when the first port is seen from a side surface of the resin valve body,
wherein the valve seat reinforcement lower part is of a bow shape when the first port is seen from the side surface of the resin valve body, and
wherein the valve seat reinforcement upper part and the valve seat reinforcement lower part form an almost L shape in section with respect to the valve seat support part.

* * * * *